US012811998B2

(12) United States Patent
Yuan

(10) Patent No.: US 12,811,998 B2
(45) **Date of Patent: *Nov. 24, 2026**

(54) UNIQUE WATERMARK GENERATION AND DETECTION DURING A CONFERENCE

(71) Applicant: Zoom Video Communications, Inc., San Jose, CA (US)

(72) Inventor: Zheng Yuan, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,310

(22) Filed: Mar. 21, 2023

(65) Prior Publication Data

US 2023/0291780 A1 Sep. 14, 2023

Related U.S. Application Data

(63) Continuation of application No. 17/092,048, filed on Nov. 6, 2020, now Pat. No. 11,647,065, which is a (Continued)

(51) Int. Cl.
*H04L 29/06* (2006.01)
*H04L 65/403* (2022.01)
(Continued)

(52) U.S. Cl.
CPC .......... *H04L 65/764* (2022.05); *H04L 65/403* (2013.01); *H04N 1/32144* (2013.01); *H04N 21/8358* (2013.01)

(58) Field of Classification Search
CPC . H04L 65/403; H04L 65/604; H04L 63/0876; H04L 63/0823; H04L 12/1822;
(Continued)

(56) References Cited

U.S. PATENT DOCUMENTS 6,064,764 A 5/2000 Bhaskaran et al.
6,357,006 B1 3/2002 Pham et al.
(Continued)

FOREIGN PATENT DOCUMENTS

EP 2801923 A1 11/2014
GB 2452021 A 2/2009
(Continued)

OTHER PUBLICATIONS

Vorbrueggen et al., "Digital Watermarking for Secure and Adaptive Teleconferencing", Proceedings of SPIE—Security and Watermarking of Multimedia Contents IV, vol. 4675, Apr. 2002, pp. 542-547.
(Continued)

*Primary Examiner* — Kostas J Katsikis
(74) *Attorney, Agent, or Firm* — Kilpatrick Townsend & Stockton LLP

(57) ABSTRACT

The unique watermark system comprising: identifying a presenter attendee, a first recipient attendee, and a second recipient attendee through a video conferencing session; detecting the presenter attendee sharing the visual content with the first recipient attendee and the second recipient attendee; selecting a first unique watermark and a second unique watermark from the plurality of unique watermarks and assigning them to a first recipient attendee and a second recipient attendee, respectively; inserting the first unique watermark into the visual content for the first recipient attendee and the second unique watermark into the visual content for the second recipient attendee; and transmitting the visual content with the first unique watermark to the first recipient attendee and the visual content with the second unique watermark to the second recipient attendee, wherein the method is performed by one or more special-purpose computing devices for hosting the video conferencing session.

20 Claims, 5 Drawing Sheets

Related U.S. Application Data continuation of application No. 16/543,502, filed on Aug. 16, 2019, now Pat. No. 10,868,849, which is a continuation of application No. 15/285,266, filed on Oct. 4, 2016, now Pat. No. 10,419,511.

(51) Int. Cl.
*H04L 65/75* (2022.01)
*H04N 1/32* (2006.01)
*H04N 21/8358* (2011.01)

(58) Field of Classification Search
CPC ....... G06F 21/16; G06F 21/10; G06T 1/0021; G06T 1/005; H04N 21/83; H04N 21/835; H04N 21/8358; H04N 1/32144; H04N 2005/91335
See application file for complete search history.

(56) References Cited

U.S. PATENT DOCUMENTS 6,393,461 B1 5/2002 Okada et al.
6,532,477 B1 3/2003 Tang et al.
6,564,322 B1 5/2003 Jameson et al.
6,606,393 B1 8/2003 Xie et al.
6,700,989 B1 3/2004 Itoh et al.
6,754,822 B1 6/2004 Zhao
6,760,443 B2 7/2004 Lacy et al.
6,785,812 B1 8/2004 Botham et al.
6,865,747 B1 3/2005 Mercier
6,957,350 B1 10/2005 Demos
7,003,731 B1 2/2006 Rhoads et al.
7,010,569 B2 3/2006 Okayasu et al.
7,095,874 B2 8/2006 Moskowitz et al.
7,107,451 B2 9/2006 Moskowitz
7,158,624 B1 1/2007 Otoole
7,203,955 B2 4/2007 Mercier
7,269,622 B2 9/2007 Brown et al.
7,287,275 B2 10/2007 Moskowitz
7,362,775 B1 4/2008 Moskowitz
7,426,750 B2 9/2008 Cooper et al.
7,436,976 B2 10/2008 Levy et al.
7,664,263 B2 2/2010 Moskowitz
7,664,264 B2 2/2010 Moskowitz et al.
7,707,262 B1 4/2010 Bill
7,738,659 B2 * 6/2010 Moskowitz ............... H04L 9/14 380/252
7,975,313 B2 7/2011 Lotspiech
8,225,099 B2 7/2012 Moskowitz et al.
8,600,026 B2 12/2013 Bill
8,863,165 B2 10/2014 Gordon
9,071,663 B2 6/2015 Oh et al.
9,323,902 B2 4/2016 Petrovic et al.
9,420,013 B1 * 8/2016 van Rensburg ....... G06F 3/0482
9,547,753 B2 1/2017 Petrovic et al.
9,596,494 B2 3/2017 Oh et al.
9,602,891 B2 3/2017 Winograd et al.
9,888,046 B2 2/2018 Wiener et al.
9,912,971 B2 3/2018 Oh et al.
9,942,602 B2 4/2018 Petrovic et al.
10,057,658 B2 8/2018 Salishev et al.
10,068,071 B2 9/2018 Shaw et al.
10,341,734 B2 7/2019 Gordon
10,419,511 B1 9/2019 Yuan
10,506,291 B2 12/2019 Gordon
10,554,976 B2 2/2020 Cain et al.
10,868,849 B2 12/2020 Yuan
2001/0051996 A1 12/2001 Cooper et al.
2001/0056468 A1 12/2001 Okayasu et al.
2002/0118862 A1 8/2002 Sugimoto et al.
2003/0046238 A1 3/2003 Nonaka et al.
2003/0056103 A1 3/2003 Levy et al.
2004/0187005 A1 9/2004 Molaro
2004/0223612 A1 11/2004 Kamijoh et al.
2005/0018687 A1 1/2005 Cutler
2005/0111558 A1 5/2005 Lecomte
2005/0114909 A1 5/2005 Mercier
2005/0190768 A1 9/2005 Cutler
2005/0213760 A1 9/2005 Lecomte et al.
2005/0243166 A1 11/2005 Cutler
2005/0243167 A1 11/2005 Clarke et al.
2005/0243168 A1 11/2005 Cutler
2006/0161776 A1 7/2006 Van et al.
2006/0242418 A1 10/2006 Willamowski et al.
2006/0269058 A1 11/2006 Kessler et al.
2007/0003102 A1 1/2007 Fujii et al.
2007/0047442 A1 3/2007 Snyder
2007/0055884 A1 3/2007 Rhoads
2007/0073837 A1 3/2007 Johnson-McCormick et al.
2007/0140307 A1 6/2007 Mercier
2007/0174624 A1 7/2007 Wolosewicz et al.
2007/0287488 A1 12/2007 Faber et al.
2008/0130059 A1 6/2008 Shindo et al.
2008/0165958 A1 7/2008 Matsushita
2008/0222419 A1 9/2008 Tewfik et al.
2009/0002480 A1 1/2009 Cutler
2009/0037388 A1 2/2009 Cooper et al.
2009/0083541 A1 3/2009 Levine
2010/0046842 A1 2/2010 Conwell
2010/0048242 A1 2/2010 Rhoads et al.
2010/0124322 A1 5/2010 Bill
2010/0313030 A1 12/2010 Yang et al.
2011/0016204 A1 1/2011 Wiener et al.
2011/0270936 A1 11/2011 Guthrie et al.
2011/0286584 A1 11/2011 Angel et al.
2012/0011592 A1 1/2012 Loeytynoja et al.
2012/0030041 A1 2/2012 Wolosewicz et al.
2012/0063319 A1 3/2012 Christin et al.
2012/0117584 A1 5/2012 Gordon
2012/0226823 A1 9/2012 Livnat et al.
2013/0091582 A1 4/2013 Chen et al.
2013/0155173 A1 6/2013 Brady et al.
2013/0198288 A1 8/2013 Jones et al.
2013/0198654 A1 8/2013 Jones et al.
2014/0026159 A1 1/2014 Cuttner et al.
2014/0047560 A1 2/2014 Meyer et al.
2014/0059116 A1 2/2014 Oh et al.
2014/0117073 A1 5/2014 Bell
2014/0137193 A1 * 5/2014 Inoue .................. H04L 12/1818 726/3
2014/0232817 A1 8/2014 Jones et al.
2014/0233716 A1 8/2014 Villette et al.
2014/0258334 A1 9/2014 Mukasa
2015/0016661 A1 1/2015 Lord
2015/0089526 A1 3/2015 Gordon
2015/0124950 A1 5/2015 Koenig
2015/0143530 A1 5/2015 Lee et al.
2015/0163311 A1 6/2015 Heath et al.
2015/0172785 A1 6/2015 Oh et al.
2015/0264410 A1 9/2015 Oh et al.
2015/0302541 A1 10/2015 Yoshimura et al.
2015/0304361 A1 * 10/2015 Tamura ............... H04L 65/1069 370/262
2015/0373032 A1 12/2015 Stevens et al.
2016/0072748 A1 3/2016 Saar et al.
2016/0253772 A1 9/2016 Kofod et al.
2016/0345079 A1 * 11/2016 Salishev .......... H04N 21/23476
2016/0380780 A1 12/2016 Stephenson et al.
2017/0017779 A1 1/2017 Huang et al.
2017/0085600 A1 3/2017 Carter et al.
2017/0094351 A1 3/2017 Gordon
2017/0163839 A1 6/2017 Arana et al.
2017/0220886 A1 8/2017 Canero Morales et al.
2018/0020028 A1 1/2018 Chang
2018/0302672 A1 10/2018 Gordon
2018/0302673 A1 10/2018 Gordon
2018/0310058 A1 10/2018 Gordon
2019/0012706 A1 1/2019 Navin et al.
2019/0373039 A1 12/2019 Yuan
2020/0065514 A1 2/2020 Keen et al.
2020/0068256 A1 2/2020 Gordon
2020/0068257 A1 2/2020 Gordon
2020/0068258 A1 2/2020 Gordon
2020/0068259 A1 2/2020 Gordon

(56) References Cited

U.S. PATENT DOCUMENTS

| | | | |
|---|---|---|---|
| 2020/0068260 | A1 | 2/2020 | Gordon |
| 2020/0228870 | A1 | 7/2020 | Gordon |
| 2020/0228871 | A1 | 7/2020 | Gordon |
| 2020/0228872 | A1 | 7/2020 | Gordon |
| 2020/0228873 | A1 | 7/2020 | Gordon |
| 2020/0228874 | A1 | 7/2020 | Gordon |
| 2020/0228875 | A1 | 7/2020 | Gordon |
| 2020/0228876 | A1 | 7/2020 | Gordon |
| 2020/0236435 | A1 | 7/2020 | Gordon |

FOREIGN PATENT DOCUMENTS

| | | | |
|---|---|---|---|
| WO | 2005074271 | A1 | 8/2005 |
| WO | 2012074645 | A1 | 6/2012 |
| WO | 2012094042 | A1 | 7/2012 |
| WO | 2012177564 | A2 | 12/2012 |
| WO | 2013018058 | A1 | 2/2013 |
| WO | 2013030339 | A1 | 3/2013 |
| WO | 2014005736 | A1 | 1/2014 |
| WO | 2015131709 | A1 | 9/2015 |
| WO | 2015196765 | A1 | 12/2015 |
| WO | 2015200470 | A1 | 12/2015 |
| WO | 2016126176 | A1 | 8/2016 |

OTHER PUBLICATIONS

Wong , “A Watermark for Image Integrity and Ownership Verification”, IS and TS Pies Conference, 1998, pp. 374-379.

* cited by examiner

380

385

UNIQUE WATERMARK GENERATION AND DETECTION DURING A CONFERENCE

PRIORITY

This patent application is a continuation patent application of U.S. application Ser. No. 17/092,048, entitled, "UNIQUE WATERMARK GENERATION AND DETECTION DURING A CONFERENCE," filed on Nov. 6, 2020 which is a continuation of U.S. application Ser. No. 16/543,502, entitled, "UNIQUE WATERMARK GENERATION AND DETECTION DURING A CONFERENCE," filed on Aug. 16, 2019, and issued on Nov. 24, 2020 as U.S. Pat. No. 10,868,849, which is a continuation patent application of U.S. application Ser. No. 15/285,266, entitled, "UNIQUE WATERMARK GENERATION AND DETECTION DURING A CONFERENCE," filed on Oct. 4, 2016, and issued on Aug. 28, 2019 as U.S. Pat. No. 10,419,511, all of which are hereby incorporated herein by reference in their entirety.

FIELD OF THE DISCLOSURE

The present disclosure relates to watermarking during a video conferencing session.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Video conferencing applications allow people to communicate with each other in remote locations through audio and video media in real time. In some instances, there is a desire to present visual content to other attendees of the video conference. It is also desirable to have the shared visual content available to be viewed and recorded by an attendee of the video conference for future use solely by the attendee of the video conference.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. Overview
2. Operation
3. Example Implementation Mechanism—Hardware Overview

1. Overview

In a video conference, an attendee may transmit visual data to other attendees of the video conference session. In one embodiment, an attendee generates a video stream from his/her location where the video stream is recorded and transmits the video stream to other attendees in real-time or near real-time. In another embodiment, an attendee may choose to share a pre-recorded video presentation, photo or document with other attendees during the video conference session.

In one embodiment, the attendee presenter shares the visual content (such as video streams, video presentations, photographs or documents) with attendee recipients during the video conference session. The attendee presenter may wish to keep the shared visual content limited to attendee recipients on the video conference session. Further, the attendee presenter sharing the visual content may wish to prevent other attendee recipients from sharing or re-publishing the visual content outside of the video conference session. For example, the attendee recipient on the video conference session could capture his/her screen during the video conference session by using a smartphone to record a photograph or video clip of his/her screen.

To discourage unauthorized sharing or re-publishing of visual content, a unique watermark corresponding to each of the attendee recipients is embedded within that attendee recipient's visual content in one embodiment. If the visual content were to be shared or re-published, the unique watermark embedded within the visual content would identify the particular attendee recipient that leaked the visual content thus providing an incentive for each of the attendee recipients to keep the visual content confidential. In one embodiment, the unique watermark is visible to the particular attendee recipient and utilizes an identifiable marker such as the attendee recipient's name or email address. In another embodiment, the unique watermark is not easily visible and is hidden within the visual content.

Figure 1:
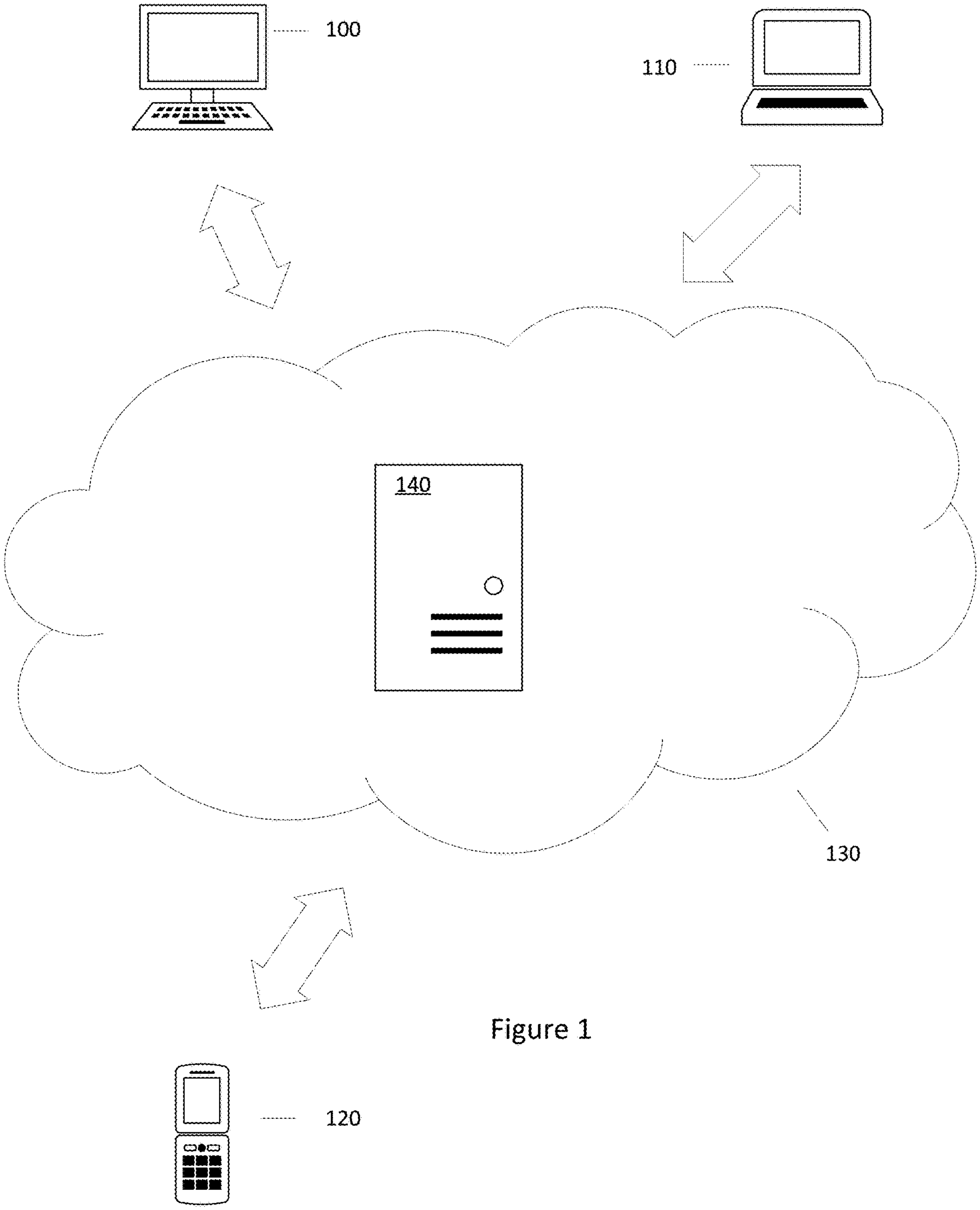
FIG. 1 illustrates a networked computer system with which an embodiment may be implemented.

FIG. 1 illustrates a networked computer system with which an embodiment may be implemented. In one approach, a server computer 140 is coupled to a network 130, which is also coupled to client computers 100, 110, 120. For purposes of illustrating a clear example, FIG. 1 shows a limited number of elements, but in practical embodiments there may be any number of certain elements shown in FIG. 1. For example, the server 140 may represent an instance among a large plurality of instances of the application server in a data center, cloud computing environment, or any other mass computing environment. There also may include thousands or millions of client computers.

In an embodiment, the server computer 140 hosts a video conferencing meeting and transmits and receives video, image, and audio data to and from each of the client computers 100, 110, 120.

Each of the client computers 100, 110, 120 comprises a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 100, 110, 120 may include an integrated or separate display unit such as a computer screen, TV screen or other display. Client computers 100, 110, 120 may comprise any of mobile or stationary computers including desktop computers, laptops, netbooks, ultrabooks, tablet computers, smartphones, etc. Typically the GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the client computers 100, 110, 120 hosts, in an embodiment, an application that allows each of the client computers 100, 110, 120 to communicate with the server computer 140. In an embodiment, the server 140 may maintain a plurality of accounts, each associated with one of the client computers 100, 110, 120 and/or one or more users of the client computers.

In one embodiment, each of the client computers 100, 110, and 120 can be used by an attendee of a video conference session. Client computers 100, 110, and 120 can be simultaneously a presenter and recipient attendee of a video conference session.

2. Operation

Figure 2:
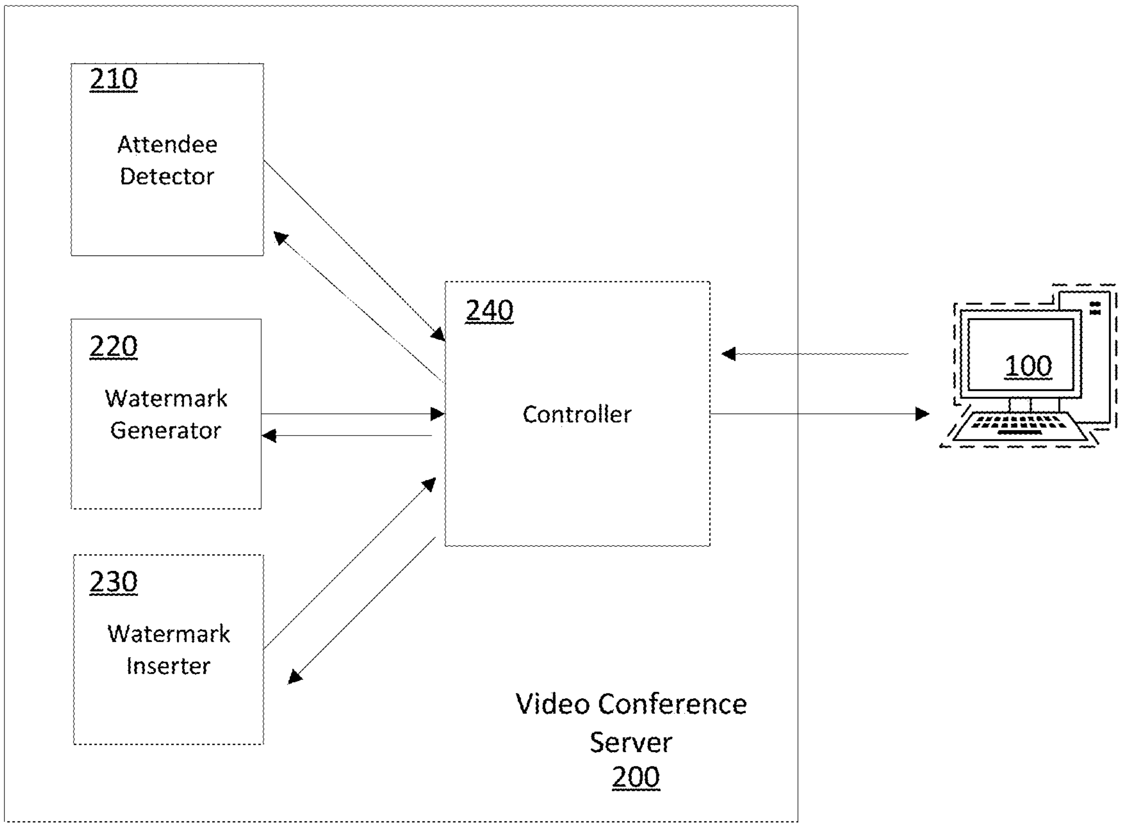
FIG. 2 illustrates a block diagram illustrating an environment according to an embodiment.

FIG. 2 is a block diagram of an exemplary video conference server 200 in accordance with one embodiment. The video conference server 200 initiates and controls a video conferencing session in one embodiment. In one embodiment, the video conference server 200 corresponds with the server 140 and initiates and controls a video conferencing session for the client computers 100, 110, and 120 which are the attendees.

The video conference server 200 includes an attendee detector 210, a watermark generator 220, a watermark inserter 230, and a controller 240. In one embodiment, the attendee detector 210 tracks the attendees participating in the video conferencing session. For example, if attendee A, B, and C are participating in the video conferencing session, the attendee detector 210 registers these three attendees. Further, the attendee detector 210 also monitors which attendees of attendee A, B, and C are presenter attendees and which of the attendees are recipient attendees. For example within a video conferencing session with attendees A, B, and C, attendee A presents a video stream as a presenter attendee which is streamed to attendees B and C which are recipient attendees for the video stream from attendee A in this instance. In this instance, the attendee detector 210 tracks attendee A as the presenter attendee and attendees B and C as the recipient attendees for the video stream originating from attendee A. During a video conferencing session, all attendees A, B, and C can be both presenter attendees and recipient attendees simultaneously.

The watermark generator 220 generates a unique watermark for visual content to be transmitted from the presenter attendee to each of the recipient attendees. For example when attendee A transmits a video stream to attendees B and C, the watermark generator 220 generates a unique watermark associated with the video stream from presenter attendee A for recipient attendee B and for recipient attendee C. In this example, there would be 2 unique watermarks generated. In one embodiment, the watermark generator 220 is within a server. In another embodiment, the watermark generator 220 is within each of the client devices.

The watermark inserter 230 inserts the unique watermark into the visual content from the presenter attendee to the recipient attendee. In one embodiment, the watermark is a unique visual identifier. For example, the watermark inserter 230 inserts the unique watermark associated with the video stream from presenter attendee A to recipient attendee B. In one embodiment, the unique watermark is inserted into each frame of the video stream such that inspection of any from within the video stream would detect the unique watermark. In a similar example, there would be different unique watermarks associated with the video stream from presenter attendee A to recipient attendee B. In this case even though the same video stream is being presented from presenter attendee A to recipient attendees B and C, there would be different watermarks inserted into the video streams designated for recipient attendees B and C.

In one embodiment, the watermark inserter 230 detects an area of the visual content which has other details and inserts the watermark into this area such that the watermark being inserted within the visual content is not noticeable to a viewer of the visual content. In another embodiment, the watermark inserter 230 inserts the unique watermark into multiple areas of the visual content. For example in the case of a video stream, the watermark inserter 230 inserts multiple instances of the unique watermark into each from of the video stream. In one embodiment, the watermark inserter 230 is within a server. In another embodiment, the watermark inserter 230 is within each of the client devices.

The controller 240 coordinates the attendees of the video conferencing session, the visual content being shared among the attendees, generation of unique watermarks for the visual content for each recipient attendee, and insertion of the unique watermark into the associated visual content prior to sharing the visual content with the associated recipient attendee.

Figure 3A:
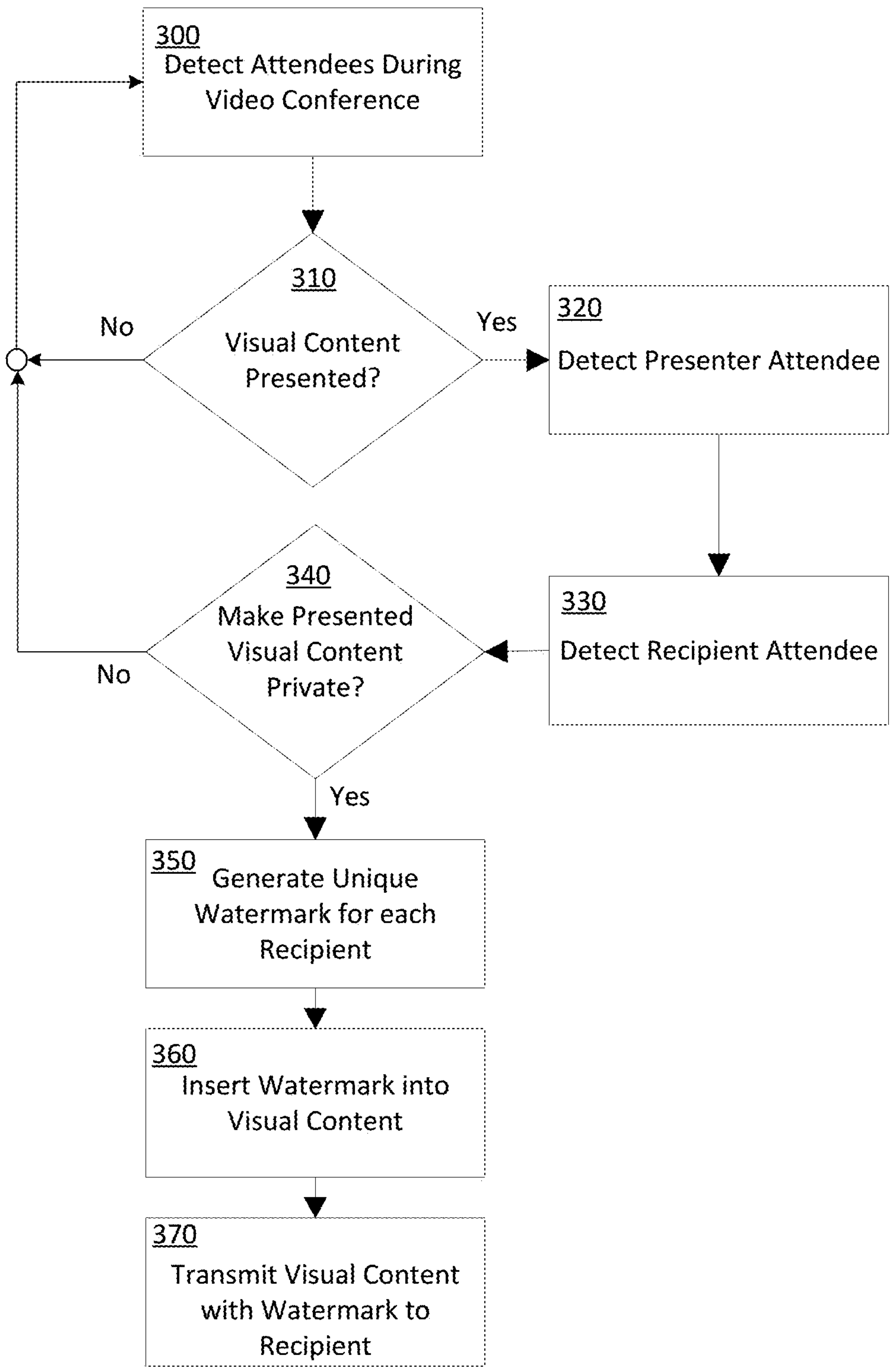
FIG. 3A illustrates a block diagram according to one embodiment.

FIG. 3A illustrates a flow diagram showing uniquely watermarking visual content for a recipient attendee during a video conferencing session according to one embodiment. In Block 300, attendees participating in a video conferencing session are detected.

If there is no visual content being presented by the attendees in Block 310, the continue detecting attendees in Block 300. If there is visual content being presented by one of the attendees in Block 310, then a presenter attendee from the detected attendees is detected in Block 320. In one embodiment, there may be multiple presenter attendees.

In Block 330, the recipient attendees are detected who will be receiving the visual content from the presenter attendee.

In Block 340, a check to see if the visual content is intended to be kept private. In one embodiment, the presenter attendee can decide whether the visual content presented by the presenter attendee should be kept private. If the desire is to keep the visual content private and not publish the visual content beyond the recipient attendees of the video conferencing session, then a unique watermark for each recipient attendee is generated in Block 350. In one embodiment, each unique watermark corresponds with each recipient attendee. In one embodiment, the unique watermarks are not detectable to the human eye and do not interfere with the presentation quality of the visual content. The unique watermarks are configured to be detected by a scan of the visual content through a scanning device such as a computer. In another embodiment, the unique watermarks are plainly visible when viewing the visual content and uniquely identifies the recipient attendee. For example, the visible watermark might include the recipient attendee's name and email address. The visible watermark might also include the notice that this visual content is "Confidential" and not to be distributed.

In Block 360, the unique watermark is inserted into the correct visual content. For example, a unique watermark is generated in Block 350 for visual content transmitted from the presenter attendee to a particular recipient attendee. This unique watermark is inserted into the visual content being transmitted from the presenter attendee to this particular recipient attendee. In most cases, there are multiple recipient attendees for a particular presenter attendee. In one embodiment, each recipient attendee has a unique watermark generated and inserted to their respective visual content being transmitted to each of them from the presenter attendee. Even though the visual content from the presenter attendee might be the similar for each recipient attendee, the unique watermark for each visual content makes the visual content among each of the recipient attendees unique. In another embodiment, the unique watermark is inserted into the visual content at the client device just prior to being displayed on the client device.

In one embodiment, an area of the visual content is selected to disguise the unique watermark. For example, an area of the visual content is selected with varying colors, lines or textures to disguise the presence of the unique watermark. This increases the user experience and prevents the presence of the unique watermark from interfering with the recipient attendee's viewing of the visual content during the video conferencing session.

In another embodiment, the location of the unique watermark is randomized and changes to avoid detection. For example with multiple frames within a video clip, the location of the unique watermark on each frame of the video clip varies.

In yet another embodiment, the unique watermark is clearly visible to the attendee recipient and includes information that identifies the attendee recipient such as a name or email address.

In one embodiment, the visual content is a static image or document where an instance of the unique watermark is inserted into the static image or document. In another embodiment, the visual content is a video clip where each frame of the video clip includes an instance of the unique watermark.

In Block 370, the visual content with the unique watermark are transmitted to the recipient attendee. In an alternate embodiment, the visual content is transmitted to a client device associated with the recipient attendee. The unique watermark is inserted into the visual content at this client device such that the visual content with the unique watermark are displayed through the client device.

Figure 3B:
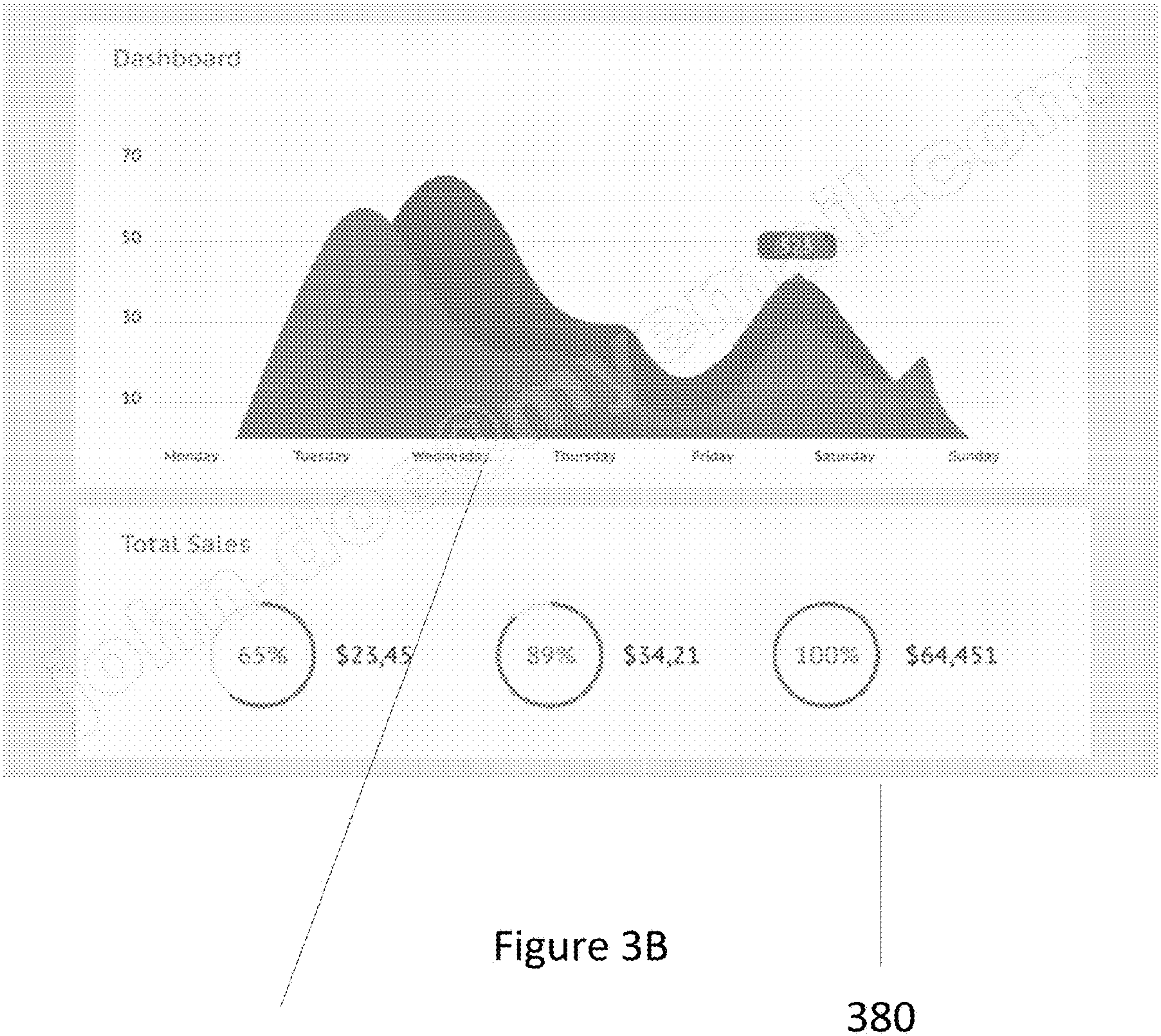
FIG. 3B illustrates an exemplary screen shot according to one embodiment.

FIG. 3B illustrates an exemplary screen shot 380 the use of uniquely watermarking visual content for a recipient attendee during a video conferencing session according to one embodiment. The screen shot 380 represents an exemplary view of one of the attendee recipients. The graph within the "dashboard" and figures within the "total sales" portion of the screen shot 380 relate to the underlying content being shared by the attendee presenter within the video conferencing session. A unique watermark 385 is part of the screen shot 380 and shows the email account associated with the attendee recipient. In this example, the watermark 385 is "john.doe@myemail.com". In other embodiments, any graphic or text can be used as the unique watermark. In this embodiment, a visible unique watermark 385 is utilized to clearly identify the identity of the attendee recipient which corresponds with the email address "john.doe@myemail.com". In another embodiment, the name of the attendee recipient could be used as the unique watermark 385.

4. Example Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
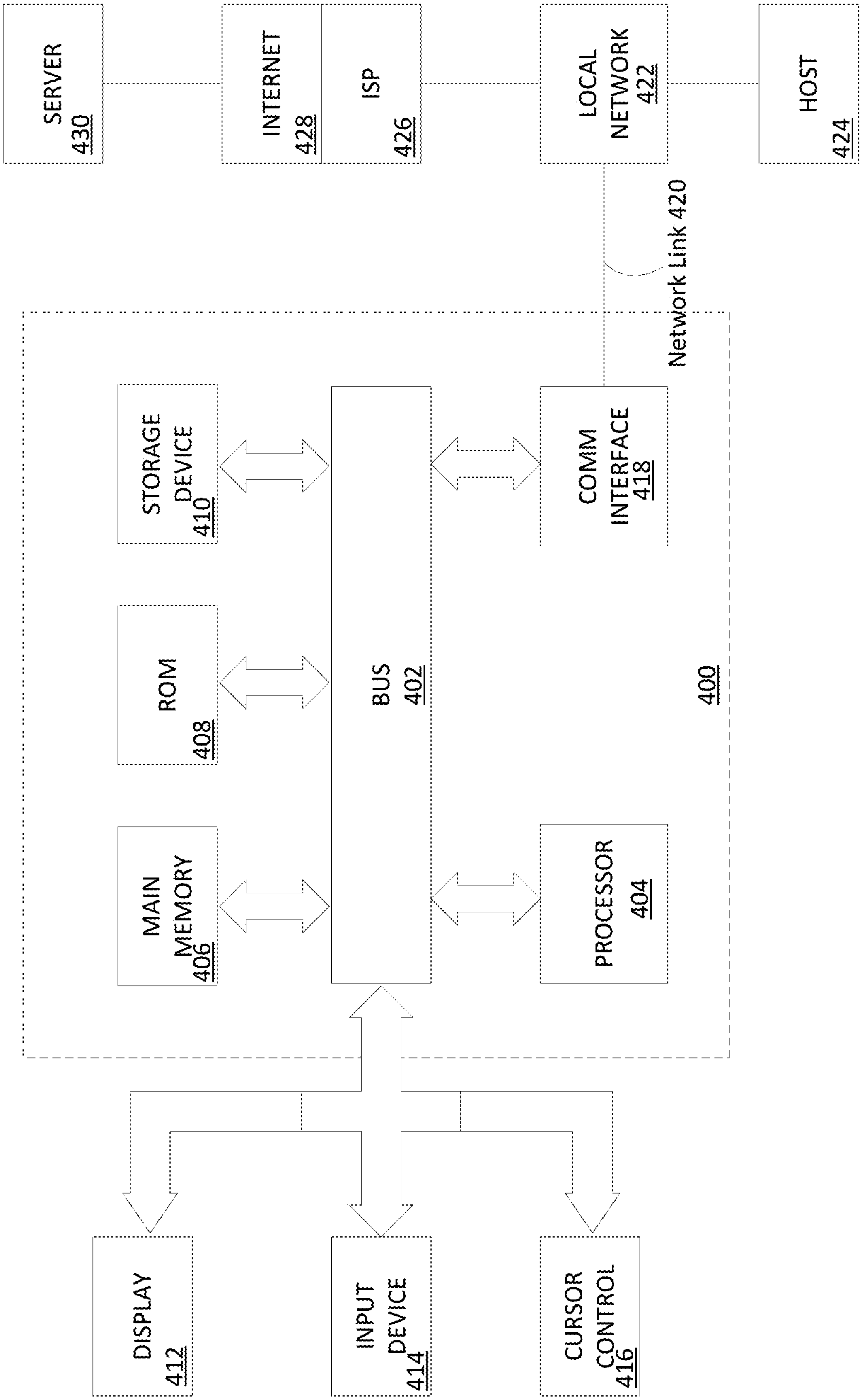
FIG. 4 illustrates a computer system with which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or a solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on a storage device either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded as an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving, from a first client device associated with a first attendee of a video conference and after the first client device has joined the video conference, visual content;

receiving, from the first client device after the first client device has joined the video conference, an indication that the visual content is private visual content;

identifying, during the video conference, a second attendee of the video conference, the private visual content to be shared with the second attendee of the video conference;

applying a unique watermark to the private visual content prior to sharing the private visual content with the second attendee, the unique watermark being specific to the second attendee; and transmitting, via the video conference, the watermarked private visual content solely to the second attendee.

2. The method of claim 1, further comprising receiving an indication to apply a watermark to the private visual content.

3. The method of claim 1, further comprising selecting a location within the private visual content to disguise the unique watermark.

4. The method of claim 1, further comprising randomly selecting a location within the private visual content for the unique watermark.

5. The method of claim 1, wherein transmitting the watermarked private visual content comprises transmitting a video feed comprising the private visual content, and further comprising:

selecting a location of the unique watermark within the private visual content for a first video frame of the video feed, and changing the location of the unique water mark within the private visual content for a second video frame of the video feed.

6. The method of claim 1, further comprising applying the unique watermark to multiple locations of the private visual content prior to sharing the private visual content.

7. The method of claim 1, wherein the unique watermark is not detectable by the human eye.

8. The method of claim 1, wherein the unique watermark is configured to be detectable by a scan of the visual content by a scanning device.

9. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

receive, from a first client device associated with a first attendee of a video conference and after the first client device has joined the video conference, visual content;

receive, from the first client device after the first client device has joined the video conference, an indication that the visual content is private visual content;

identify, during the video conference, a second attendee of the video conference, the private visual content to be shared with the second attendee of the video conference;

apply a unique watermark to the private visual content prior to sharing the private visual content with the second attendee, the unique watermark being specific to the second attendee; and transmit the watermarked private visual content solely to the second attendee.

10. The system of claim 9, wherein the one or more processors are configured to execute further processor-executable instructions stored in the non-transitory computer-readable medium to receive an indication to apply a watermark to the private visual content.

11. The system of claim 9, wherein the one or more processors are configured to execute further processor-executable instructions stored in the non-transitory computer-readable medium to select a location within the private visual content to disguise the unique watermark.

12. The system of claim 9, wherein the one or more processors are configured to execute further processor-executable instructions stored in the non-transitory computer-readable medium to randomly select a location within the private visual content for the unique watermark.

13. The system of claim 9, wherein transmitting the watermarked private visual content comprises transmitting a video feed comprising the private visual content, and wherein the one or more processors are configured to execute further processor-executable instructions stored in the non-transitory computer-readable medium to:

select a location of the unique watermark within the private visual content for a first video frame of the video feed, and change the location of the unique water mark within the private visual content for a second video frame of the video feed.

14. The system of claim 9, wherein the one or more processors are configured to execute further processor-executable instructions stored in the non-transitory computer-readable medium to apply the unique watermark to multiple locations of the private visual content prior to sharing the private visual content.

15. The system of claim 9, wherein the unique watermark is not detectable by the human eye.

16. The system of claim 9, wherein the unique watermark is configured to be detectable by a scan of the visual content by a scanning device.

17. A non-transitory computer-readable medium comprising processor-executable instructions configured to cause one or more processors to:

receive, from a first client device associated with a first attendee of a video conference and after the first client device has joined the video conference, visual content;

receive, from the first client device after the first client device has joined the video conference, an indication that the visual content is private visual content;

identify, during the video conference, a second attendee of the video conference, the private visual content to be shared with the second attendee of the video conference;

apply a unique watermark to the private visual content prior to sharing the private visual content with the second attendee, the unique watermark being specific to the second attendee; and transmit the watermarked private visual content solely to the second attendee.

18. The non-transitory computer-readable medium of claim 17, wherein transmitting the watermarked private visual content comprises transmitting a video feed comprising the private visual content, and further comprising processor-executable instructions configured to cause the one or more processors to:

select a location of the unique watermark within the private visual content for a first video frame of the video feed, and change the location of the unique water mark within the private visual content for a second video frame of the video feed.

19. The non-transitory computer-readable medium of claim 17, further comprising processor-executable instructions configured to cause the one or more processors to select a location within the private visual content to disguise the unique watermark.

20. The non-transitory computer-readable medium of claim 17, further comprising processor-executable instructions configured to cause the one or more processors to randomly select a location within the private visual content for the unique watermark.

* * * * *